United States Patent
Matin et al.

(10) Patent No.: US 10,064,210 B2
(45) Date of Patent: Aug. 28, 2018

(54) CHANNEL QUALITY REPORTING FOR DETERMINISTIC NULL SCHEDULING

(71) Applicant: QUALCOMM Incorporated, San Diego, CA (US)

(72) Inventors: Sharif Matin, San Diego, CA (US); Carsten Aagaard Pedersen, Cambridge, MA (US); Ramesh Chandra Chirala, San Diego, CA (US); Linda Bai, San Jose, CA (US); Prasanta Samal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 138 days.

(21) Appl. No.: 14/819,782

(22) Filed: Aug. 6, 2015

(65) Prior Publication Data
US 2016/0242202 A1 Aug. 18, 2016

Related U.S. Application Data

(60) Provisional application No. 62/115,537, filed on Feb. 12, 2015.

(51) Int. Cl.
*H04W 72/12* (2009.01)
*H04L 1/00* (2006.01)
(Continued)

(52) U.S. Cl.
CPC ...... *H04W 72/1273* (2013.01); *H04B 7/0632* (2013.01); *H04L 1/0026* (2013.01);
(Continued)

(58) Field of Classification Search
None
See application file for complete search history.

(56) References Cited

U.S. PATENT DOCUMENTS 7,496,048 B2 * 2/2009 Ikeda .................. H04W 24/10
370/252
9,332,452 B2 * 5/2016 Gutierrez ............ H04W 24/10
(Continued)

FOREIGN PATENT DOCUMENTS

GB          2494499 A       3/2013

OTHER PUBLICATIONS

Philips, "Discussion and text proposal for CQI enhancement in compressed mode", May 23, 2003, 4 pages.*
(Continued)

*Primary Examiner* — Bunjob Jaroenchonwanit
(74) *Attorney, Agent, or Firm* — Arent Fox, LLP (57) ABSTRACT

The disclosure provides for reporting a channel quality indicator (CQI) in wireless communications. A user equipment (UE) may determine that a calculated CQI value to be reported in a current sub-frame is affected by a deterministic null scheduling on a downlink channel. The UE may determine a compensatory CQI value. The UE may report the lesser of the calculated CQI value and the compensatory CQI value in response to determining that the calculated CQI value is affected by the deterministic null scheduling. In an aspect, the deterministic null scheduling is associated with a compressed mode gap. The UE may determine whether the calculated CQI value is affected by the deterministic null scheduling by determining whether the current sub-frame is within a first time period before the start of the compressed mode gap or within a second time period after the end of the compressed mode gap.

31 Claims, 4 Drawing Sheets

(51) Int. Cl.
    *H04L 1/20*     (2006.01)
    *H04B 7/06*     (2006.01)
(52) U.S. Cl.
    CPC .............. *H04L 1/0036* (2013.01); *H04L 1/20*
    (2013.01); *H04W 72/1231* (2013.01)

(56) References Cited

U.S. PATENT DOCUMENTS

| | | | | |
|---|---|---|---|---|
| 2006/0285522 | A1* | 12/2006 | Kim | H04L 47/14 |
| | | | | 370/331 |
| 2008/0064386 | A1* | 3/2008 | Nibe | H04W 74/0808 |
| | | | | 455/422.1 |
| 2009/0036117 | A1 | 2/2009 | Sollenberger et al. | |
| 2009/0168662 | A1* | 7/2009 | Tsuboi | H04L 1/20 |
| | | | | 370/252 |
| 2010/0034114 | A1* | 2/2010 | Kim | H04L 1/0026 |
| | | | | 370/252 |
| 2010/0177713 | A1* | 7/2010 | Yoshii | H04L 1/0027 |
| | | | | 370/329 |
| 2010/0329134 | A1* | 12/2010 | Doppler | H04L 1/0029 |
| | | | | 370/252 |
| 2011/0280136 | A1* | 11/2011 | Wang | H04B 7/2656 |
| | | | | 370/241 |
| 2011/0300869 | A1* | 12/2011 | Iwamura | H04W 36/30 |
| | | | | 455/436 |
| 2013/0265960 | A1* | 10/2013 | Wang | H04L 1/0026 |
| | | | | 370/329 |
| 2013/0308612 | A1* | 11/2013 | Cai | H04L 1/0028 |
| | | | | 370/336 |
| 2014/0036797 | A1* | 2/2014 | Palanivelu | H04W 72/085 |
| | | | | 370/329 |
| 2014/0098697 | A1* | 4/2014 | Wang | H04L 1/0026 |
| | | | | 370/252 |
| 2015/0098342 | A1* | 4/2015 | Tabet | H04W 76/028 |
| | | | | 370/242 |
| 2015/0296524 | A1* | 10/2015 | Huang | H04L 1/0019 |
| | | | | 370/329 |

OTHER PUBLICATIONS

International Search Report and Written Opinion—PCT/US2016/013652—ISA/EPO—dated Apr. 4, 2016. 11 Total Pages.

\* cited by examiner

CHANNEL QUALITY REPORTING FOR DETERMINISTIC NULL SCHEDULING

CROSS-REFERENCE TO RELATED APPLICATIONS

This application claims priority to U.S. provisional application No. 62/115,537, titled "CQI REPORTING FOR COMPRESSED MODE" filed on Feb. 12, 2015 and hereby incorporated by reference herein in its entirety.

BACKGROUND

Aspects of the present disclosure relate generally to wireless communication systems, and more particularly, to channel quality reporting in wireless communication systems.

Wireless communication networks are widely deployed to provide various communication services such as telephony, video, data, messaging, broadcasts, and so on. Such networks, which are usually multiple access networks, support communications for multiple users by sharing the available network resources. One example of such a network is the UMTS Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). The UMTS, which is the successor to Global System for Mobile Communications (GSM) technologies, currently supports various air interface standards, such as Wideband-Code Division Multiple Access (W-CDMA), Time Division-Code Division Multiple Access (TD-CDMA), and Time Division-Synchronous Code Division Multiple Access (TD-SCDMA). The UMTS also supports enhanced 3G data communications protocols, such as High Speed Packet Access (HSPA), which provides higher data transfer speeds and capacity to associated UMTS networks.

As the demand for mobile broadband access continues to increase, research and development continue to advance the UMTS technologies not only to meet the growing demand for mobile broadband access, but to advance and enhance the user experience with mobile communications.

A wireless communication network may use channel quality indicator (CQI) reporting to determine a modulation scheme for transmissions. For example, a UE may report a CQI value based on a measured signal to interference plus noise ratio (SINR). The CQI value may indicate to a base station or node B the size of a transport block that the UE is able to decode under the current channel conditions. Generally, a higher CQI value may indicate better channel conditions and the ability to decode a larger transport block (e.g, with a higher coding rate or higher order modulation scheme). If a CQI value reported by the UE does not accurately reflect the channel conditions, the node B may not select the best modulation scheme, and a block error rate (BLER) may increase, and/or a system throughput may decrease. The block error rate for sub-frames may be referred to as a sub-frame block error rate (SBLER). Accordingly, more effective channel quality reporting is desirable.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its purpose is to present some concepts of one or more aspects in a simplified form as a prelude to the more detailed description that is presented later.

The disclosure provides for reporting a channel quality indicator (CQI) in wireless communications. A user equipment (UE) may determine that a calculated CQI value to be reported in a current sub-frame is affected by a deterministic null scheduling on a downlink channel. The UE may determine a compensatory CQI value. The UE may report the lesser of the calculated CQI value and the compensatory CQI value in response to determining that the calculated CQI value is affected by the deterministic null scheduling. In an aspect, the deterministic null scheduling is associated with a compressed mode gap. The UE may determine whether the calculated CQI value is affected by the deterministic null scheduling by determining whether the current sub-frame is within a first time period before the start of the compressed mode gap or within a second time period after the end of the compressed mode gap.

In an aspect, the disclosure provides a method of wireless communications. The method may include determining that a calculated CQI value to be reported in a current sub-frame is affected by a deterministic null scheduling on a downlink channel. The method may further include determining a compensatory CQI value. The method may also include reporting the lesser of the calculated CQI value and the compensatory CQI value in response to determining that the calculated CQI value is affected by the deterministic null scheduling.

In an aspect of the method, determining whether the calculated CQI value is affected by the deterministic null scheduling may include determining whether the current sub-frame is within a configured time period of a sub-frame with deterministic null scheduling.

In an aspect of the method, the deterministic null scheduling is associated with a compressed mode gap. Additionally, determining whether the calculated CQI value is affected by the deterministic null scheduling may include determining whether the current sub-frame is within a first time period before the start of the compressed mode gap or within a second time period after the end of the compressed mode gap.

In other aspects of the method, determining the compensatory CQI value may include: determining an average calculated CQI value for a plurality of most recently reported sub-frames, selecting a minimum reported CQI value for a plurality of most recently scheduled sub-frames, using a fixed CQI value, or reducing another CQI value.

In an aspect of the method, the reporting is further in response to determining that a scheduling rate is greater than a threshold and/or determining that a UE is in an active high-speed call in a dedicated channel state with compressed mode active. The downlink channel may be a high-speed physical downlink shared channel (HS-PDSCH).

In another aspect, the disclosure provides an apparatus for reporting a CQI. The apparatus may include a transceiver, at least one processor, and a memory coupled to the at least one processor. The transceiver may be configured to receive sub-frames of a downlink channel. The memory may be configured to store scheduling information for the downlink channel. The processor may be communicatively coupled to the memory and the transceiver via at least one bus and may be configured to determine that a calculated CQI value to be reported in a current sub-frame is affected by deterministic null scheduling on a downlink channel. The processor may be further configured to determine a compensatory CQI value. The processor may also be configured to report, via the transceiver, the lesser of the calculated CQI value and the compensatory CQI value in response to determining that the calculated CQI value is affected by the deterministic null scheduling.

In another aspect, the disclosure provides another apparatus for reporting a CQI. The apparatus may include means for determining that a calculated CQI value to be reported in a current sub-frame is affected by deterministic null scheduling on a downlink channel. The apparatus may further include means for determining a compensatory CQI value. The apparatus may also include means for reporting the lesser of the calculated CQI value and the compensatory CQI value in response to determining that the calculated CQI value is affected by the deterministic null scheduling.

In another aspect, the disclosure provides a computer-readable medium storing computer executable code for reporting a CQI. The computer-readable medium may include code for determining that a calculated CQI value to be reported in a current sub-frame is affected by a deterministic null scheduling on a downlink channel. The computer-readable medium may further include code for determining a compensatory CQI value. The computer-readable medium may also include code for reporting the lesser of the calculated CQI value and the compensatory CQI value in response to determining that the calculated CQI value is affected by the deterministic null scheduling.

These and other aspects of the invention will become more fully understood upon a review of the detailed description, which follows.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

In a wireless communications system, a CQI value determined by a UE may be affected by deterministic null scheduling. Deterministic null scheduling may include any sub-frame where a UE may determine that the UE will not be scheduled to receive a downlink transmission. For example, deterministic null scheduling may occur due to a compressed mode transmission gap, connected mode discontinuous reception, or a scheduling pattern. For example, the UE may be unable to transmit an acknowledgement (ACK) or negative acknowledgment (NACK) during the compressed mode transmission gap. Accordingly, a base station may refrain from scheduling the UE to receive downlink traffic in sub-frames before the start of the transmission gap. The lack of downlink traffic may result in measurements that produce a higher CQI value. For example, a measurement of signal quality such as the common pilot channel (CPICH) ratio of channel energy to interference (Echo) may be artificially boosted due to lack of downlink traffic and inter-channel interference. Also, lack of downlink traffic may cause fluctuations in automatic gain control (AGC). Therefore, CQI determinations made just before the transmission gap may tend to be artificially high. Further, the UE may be prevented from transmitting a CQI report after the transmission gap because no downlink measurements are available during the transmission gap. Accordingly, a base station may continue to use the artificially boosted CQI value from before the transmission gap. Similar artificial increases in CQI values may occur when the UE is not scheduled for other reasons. The artificial increase in CQI value may result in the base station choosing a modulation scheme or transport block size that is too difficult for the UE to decode correctly given the actual channel conditions. An increase in sub-frame block error rate (SBLER) has been detected for sub-frames surrounding transmission gaps. The increase in SBLER may result in lower throughput as the transport blocks need to be retransmitted.

A UE may use a compensatory CQI determination for sub-frames affected by compressed mode gaps. In an aspect, the compensatory CQI determination may generally produce a lower CQI value than a CQI value based on measurements. Accordingly, the compensatory CQI determination may be an alternative CQI value that compensates for the artificial increase in CQI due to compressed mode gaps. The term "calculated CQI value" as used herein, may refer to a CQI value that is based on recent measurements. The calculated CQI value may be reported for sub-frames that are not affected by a compressed mode gap or other deterministic null scheduling. On the other hand, the compensatory CQI value may be based on an average or minimum CQI value for an extended range of sub-frames. The UE may compare the compensatory CQI value with a calculated CQI value during the affected sub-frames to determine whether channel conditions have changed. Accordingly, the UE may report the lower of the calculated CQI value or the compensatory CQI value. In an aspect, the compensatory CQI value may be used when the UE has a relatively high scheduling rate (e.g., high downlink traffic rates). The compensatory CQI value may result in a reduction in scheduling rate or data rate (e.g., transport block size) for the UE, which may provide a reduction in BLER and an actual increase in throughput.

Figure 1:
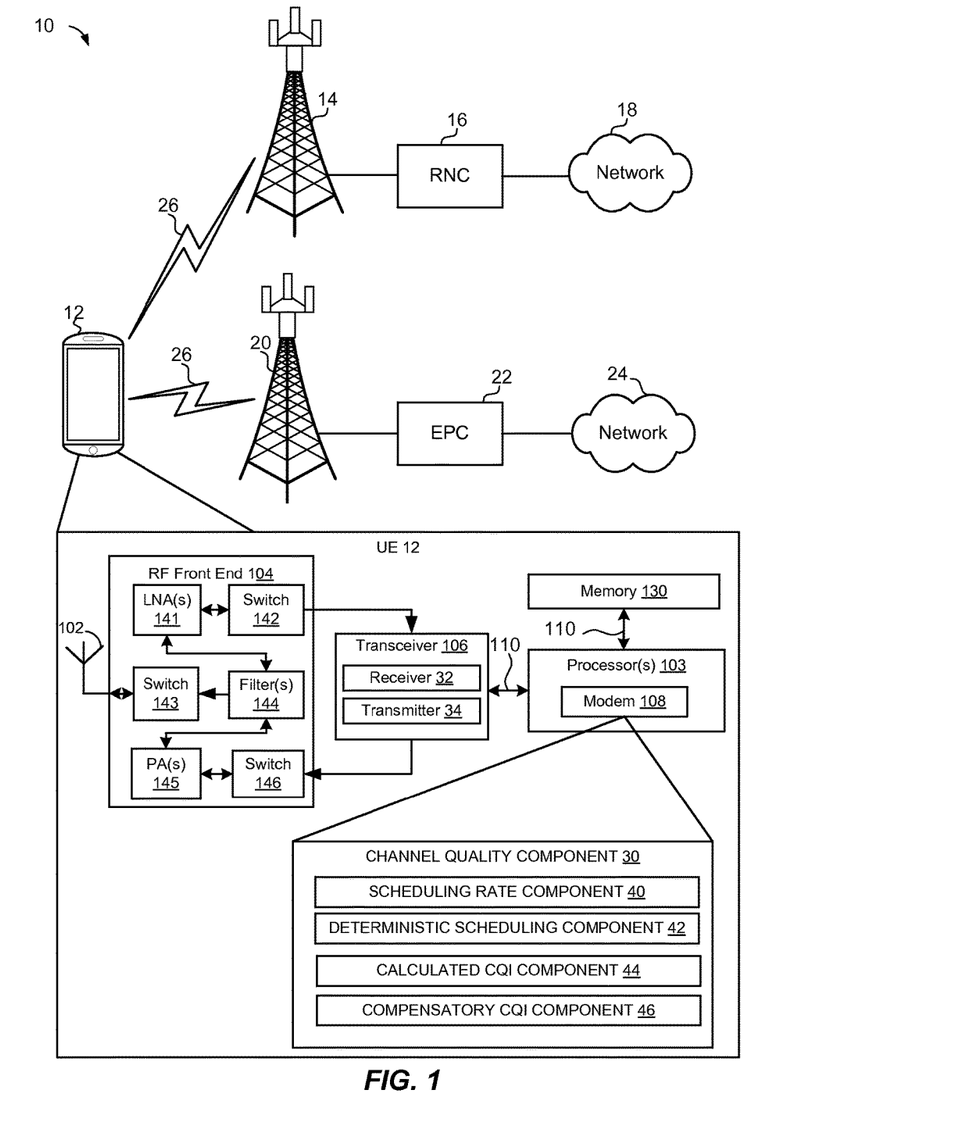
FIG. 1 is a block diagram illustrating an example communications network including a base station in communication with a user equipment.

Referring to FIG. 1, in an aspect, a wireless communication system 10 includes at least one UE 12 in communication coverage of at least one network entity 14 (e.g., base station or node B in an HSPA network). UE 12 may communicate with a network 18 via the network entity 14 and a radio network controller (RNC) 16. In some aspects, multiple UEs including UE 12 may be in communication coverage with one or more network entities, including network entity 14 and network entity 20. In an aspect, the network entity 20 may be a base station such an eNodeB in a long term evolution (LTE) network 24 including an evolved packet core (EPC) 22. Although various aspects are described in relation to a UMTS HSPA network, similar principles may be applied in an LTE network, Evolution-Data Optimized (EV-DO) network, or other wireless wide area networks (WWAN). The wireless network may employ a scheme where data assignments by the network in the downlink (a.k.a. forward link) is a function of channel quality reporting by the UE 12 in the uplink (a.k.a. reverse link). In an example, UE 12 may transmit and/or receive wireless communications to and/or from network entity 14 and/or network entity 20. In an aspect, the UE 12 may operate in a connected mode (e.g., CELL DCH state) with compressed mode. For example, the UE 12 may be actively communicating with network entity 14. Compressed mode may create transmission gaps where the UE 12 interrupts the communications with network entity 14 to measure another cell such as, for example, network entity 20, which may use a different carrier frequency and/or radio access technology (RAT). Compressed mode may also be used when the UE 12 is actively communicating with the network entity 20 (e.g., in a connected mode).

In an aspect, the network entity 14 may communicate with the UE 12 via a high speed packet access (HSPA) air interface. HSPA utilizes hybrid automatic repeat request (HARQ), shared channel transmission, and adaptive modulation and coding. The standards that define HSPA include HSDPA (high speed downlink packet access) and HSUPA (high speed uplink packet access, also referred to as enhanced uplink, or EUL). HSDPA utilizes as its transport channel the high-speed downlink shared channel (HS-DSCH). The HS-DSCH is implemented by three physical channels: the high-speed physical downlink shared channel (HS-PDSCH), the high-speed shared control channel (HS-SCCH), and the high-speed dedicated physical control channel (HS-DPCCH). Among these physical channels, the HS-PDSCH carries transport blocks to be decoded by specific scheduled UEs. The HS-SCCH indicates which UEs are scheduled on the HS-PDSCH in each sub-frame. The HS-DPCCH carries the HARQ ACK/NACK signaling on the uplink to indicate whether a corresponding packet transmission was decoded successfully. That is, with respect to the downlink, the UE 12 provides feedback to the network entity 14 over the HS-DPCCH to indicate whether it correctly decoded a packet on the downlink. HS-DPCCH further includes feedback signaling from the UE 12 to assist the node B 14 in taking the right decision in terms of modulation and coding scheme and precoding weight selection, this feedback signaling including the CQI and PCI. In an aspect, when the current sub-frame is affected by deterministic null scheduling, the reported CQI value may preferably be the lesser of a calculated CQI value based on channel measurements and a compensatory CQI value.

In the downlink communication, the network entity 14 may transmit signals (e.g. HS-PDSCH) based on various modulation schemes (e.g., binary phase-shift keying (BPSK), quadrature phase-shift keying (QPSK), M-phase-shift keying (M-PSK), M-quadrature amplitude modulation (M-QAM), and the like). For example, the network entity 14 may adapt a modulation and coding scheme used for the HS-PDSCH for each sub-frame. Channel estimates may be used to determine the coding, modulation, spreading, and/or scrambling schemes for the downlink transmission. These channel estimates may be derived from a reference signal transmitted by the UE 12 or from a CQI value received from the UE 12. The CQI value may be a calculated CQI value or a compensatory CQI value; however, the CQI determination may be transparent to the network entity 14. Accordingly, the network entity 14 may determine the coding, modulation, spreading, and/or scrambling schemes regardless of how the CQI value is determined by the UE.

In some aspects, UE 12 may also be referred to by those skilled in the art (as well as interchangeably herein) as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a terminal, a user agent, a mobile client, a client, or some other suitable terminology. A UE 12 may be a cellular phone, a personal digital assistant (PDA), a wireless modem, a wireless communication device, a handheld device, a tablet computer, a laptop computer, a cordless phone, a wireless local loop (WLL) station, a global positioning system (GPS) device, a multimedia device, a video device, a digital audio player (e.g., MP3 player), a camera, a game console, a wearable computing device (e.g., a smart-watch, smart-glasses, a health or fitness tracker, etc), an appliance, a sensor, a vehicle communication system, a medical device, a vending machine, a device for the Internet-of-Things, or any other similar functioning device. Additionally, network entity 14 may be a macrocell, picocell, femtocell, relay, Node B, mobile Node B, UE (e.g., communicating in peer-to-peer or ad-hoc mode with UE 12), or substantially any type of component that can communicate with UE 12 to provide wireless network access at the UE 12.

According to the present aspects, the UE 12 may include one or more processors 103 that may operate in combination with a channel quality component 30 configured to report CQI values. For example, the channel quality component 30 may report either a calculated CQI value or a compensatory CQI value. In an aspect, the term "component" as used herein may be one of the parts that make up a system, may be hardware, firmware, and/or software, and may be divided into other components. The channel quality component 30 may be communicatively coupled to a transceiver 106, which may include a receiver 32 for receiving and processing RF signals and a transmitter 34 for processing and transmitting RF signals. The channel quality component 30 may include a scheduling rate component 40 for determining a scheduling rate of the UE 12, a deterministic scheduling component 42 for determining whether a calculated CQI value is affected by deterministic null scheduling of the UE 12, a calculated CQI component 44 for determining a CQI value based on measurements, and a compensatory CQI component 46 for determining a compensatory CQI value. The processor 103 may be coupled to the transceiver 106 and a memory 130 via at least one bus 110.

The receiver 32 may include hardware, firmware, and/or software code executable by a processor for receiving data, the code comprising instructions and being stored in a memory (e.g., computer-readable medium). The receiver 32 may be, for example, a radio frequency (RF) receiver. In an aspect, the receiver 32 may receive and decode signals transmitted by the network entity 14. The receiver 32 may obtain measurements of the signals that may be used to determine a calculated CQI value. For example, the receiver 32 may determine Ec/Io, SNR, etc. Further, the receiver 32 may determine a BLER. If the receiver 32 is unable to successfully decode a transport block carried by the signals (e.g., CRC failure), a block error may be recorded. The BLER may represent a ratio of block errors to total received transport blocks. A high block error rate may indicate that the CQI value is too high. The receiver 32 may also determine an SBLER for one or more sub-frames.

The transmitter 34 may include hardware, firmware, and/or software code executable by a processor for transmitting data, the code comprising instructions and being stored in a memory (e.g., computer-readable medium). The transmitter 34 may be, for example, a RF transmitter. The transmitter 34 may transmit a determined CQI value during a set time interval. For example, a CQI value may be carried on an uplink high-speed dedicated physical control channel (HS-DPCCH). The timing of the HS-DPCCH may be based on the timing of downlink channels received by the receiver 32. Similarly, in an LTE system, the transmitter 34 may periodically transmit a determined CQI value on a physical uplink control channel (PUCCH) or a physical uplink shared channel (PUSCH).

In an aspect, the one or more processors 103 can include a modem 108 that uses one or more modem processors. The various functions related to channel quality component 30 may be included in modem 108 and/or processors 103 and, in an aspect, can be executed by a single processor, while in other aspects, different ones of the functions may be executed by a combination of two or more different processors. For example, in an aspect, the one or more processors 103 may include any one or any combination of a modem processor, or a baseband processor, or a digital signal processor, or a transmit processor, or a transceiver processor associated with transceiver 106. In particular, the one or more processors 103 may implement components included in channel quality component 30, including a scheduling rate component 40 for determining a scheduling rate of the UE 12, a deterministic scheduling component 42 for determining whether a calculated CQI value is affected by deterministic null scheduling of the UE 12, a calculated CQI component 44 for determining a CQI value based on measurements, and a compensatory CQI component 46 for determining a compensatory CQI value.

The scheduling rate component 40 may include hardware, firmware, and/or software code executable by processor 103 for determining a scheduling rate of the UE 12, the code comprising instructions and being stored in a memory (e.g., computer-readable medium). A scheduling rate may indicate how often the UE 12 is scheduled to receive data. In an aspect, the scheduling rate may be determined based on a number of scheduled sub-frames for the UE 12 during a most recent number of sub-frames. For example, the scheduling rate may be calculated as the number of scheduled sub-frames in the last N sub-frames, divided by N. In an aspect, the scheduling rate component 40 may exclude sub-frames having deterministic null scheduling from the last N sub-frames so that the scheduling rate indicates a rate of scheduling on available sub-frames. The scheduling rate may also be a data rate. For example, the scheduling rate may be determined based on the amount of downlink data received during a time period. The scheduling rate component 40 may also compare the determined scheduling rate to a threshold. The threshold may indicate a level where the UE 12 is considered busy. When the UE 12 is busy, an artificial increase in the reported CQI value may result in lower throughput for the UE 12 due to block errors. Conversely, when the UE is not busy, throughput may be less important, or block errors may be less likely due to smaller block sizes.

The deterministic scheduling component 42 may include hardware, firmware, and/or software code executable by processor 103 for determining whether a calculated CQI value is affected by deterministic scheduling, the code comprising instructions and being stored in a memory (e.g., computer-readable medium). In an aspect, deterministic null scheduling may include any sub-frame where the UE 12 may predict that the UE 12 will not be scheduled to receive a downlink transmission on a downlink channel. In contrast, a sub-frame where the UE is not scheduled due to downlink resources being used for other UEs or a lack of downlink traffic for the UE may not be considered deterministic null scheduling. The deterministic scheduling component 42 and/or the memory 130 may store scheduling information that may be used to determine null scheduling. The deterministic null scheduling may affect the calculated CQI value because measurements (e.g., SINR) may not include inter-channel interference caused by the downlink transmission on the channel.

For example, deterministic null scheduling may occur in association with or due to a compressed mode transmission gap. The deterministic scheduling component 42 may determine the timing of compressed mode transmission gaps based on parameters signaled by the network entity 14. The parameters may be stored by deterministic scheduling component 42 and/or the memory 130 as scheduling information. The deterministic scheduling component 42 may further determine which sub-frames will be affected by the compressed mode transmission gaps. For example, a configured value, x, may indicate the number of sub-frames before the start of a transmission gap that are affected by the transmission gap. The value of x may be based on the configuration of the network entity 14. In an aspect, the deterministic scheduling component 42 may determine the value of x based on a number of sub-frames where the UE 12 is not scheduled on the HS-DPSCH before the start of a transmission gap (e.g., based on an observed pattern). For example, the value of x may indicate a number of sub-frames with deterministic null scheduling on the HS-DPSCH. The deterministic scheduling component 42 may use a configured value, y, to determine a number of sub-frames after the end of the transmission gap that are affected by the transmission gap. The affected sub-frames may include sub-frames where a CQI report is not permitted because no downlink measurements were performed during a reference period during the transmission gap. The affected sub-frames after the transmission gap may also include sub-frames based on measurements made immediately after the transmission gap where the UE 12 may not have been scheduled (e.g., because the HS-SCCH sub-frame overlapped the transmission gap).

Deterministic null scheduling may also occur any time a UE 12 may be aware of a sub-frame in which the UE 12 is unlikely to be scheduled. For example, connected mode discontinuous reception (CDRX) may be used to turn off the receiver 32 for some sub-frames. The deterministic scheduling component 42 and/or the memory 130 may store a CDRX period as scheduling information. In an aspect, the deterministic scheduling component 42 may determine that the UE 12 is unlikely to be scheduled in sub-frames related to a CDRX period (e.g., sub-frames immediately following the CDRX period). As another example, the UE 12 may be in a data call where the UE 12 receives data periodically (e.g., large periodic bursts for streaming media). The deterministic scheduling component 42 may determine sub-frames where the UE 12 is unlikely to be scheduled based on the characteristics of the data call. For example, the deterministic scheduling component 42 may determine a scheduling pattern by measuring time periods where the UE 12 is not scheduled before or after various events. As a further example, deterministic null scheduling may occur in response to reporting a CQI value of zero (0) for a reason other than RF conditions. A UE 12 may report a CQI value of zero (0) for various reasons. The deterministic scheduling component 42 may expect null scheduling in sub-frames following the reported CQI value of zero (0). Other situations where deterministic null scheduling may occur include tune away of a transceiver to another radio access technology and higher layer reconfiguration (e.g., radio resource control (RRC) layer reconfiguration). The deterministic scheduling component 42 may determine that a current sub-frame is affected by deterministic null scheduling when the current sub-frame is within a time period before or after a sub-frame having deterministic null scheduling.

The calculated CQI component 44 may include hardware, firmware, and/or software code executable by processor 103 for determining a CQI value based on measurements, the code comprising instructions and being stored in a memory (e.g., computer-readable medium). For example, the calculated CQI component 44 may determine a CQI value based on measurements during a reference period. In an aspect, the reference period may be the three (3) slots (sub-frame) preceding the current sub-frame. The calculated CQI value may be determined by methods known in the art, for example, based on a measured channel quality such as a signal to noise ratio (SNR) SINR, and/or Ec/Io. For example, a CQI value may be calculated using a look-up table according to the SNR or SINR, which may be based on an Ec/Io measurement. The calculated CQI value may indicate a transport block size and/or modulation and coding scheme that the UE 12 should be able to receive with a given BLER (e.g., less than 10%).

The compensatory CQI component 46 may include hardware, and/or software code executable by processor 103 for determining a compensatory CQI value, the code comprising instructions and being stored in a memory (e.g., computer-readable medium). A compensatory CQI value may be a CQI value that compensates for effects of null scheduling on measurements and CQI value calculations. In an aspect, the compensatory CQI value may be determined without measurements during the reference period. For example, the compensatory CQI value may be determined based on an average reported CQI value for a plurality of most recently scheduled sub-frames. For example, the average may be based on the N most recent sub-frames where HS-PDSCH was scheduled. N may be, for example, 5. As another example, the compensatory CQI value may be determined by selecting a minimum reported CQI value from CQI values reported during the plurality of most recently scheduled sub-frames. As another example, the compensatory CQI value may be a fixed value. In an aspect, the fixed value may be pre-configured, configured by the network entity, and/or stored in a memory (e.g., memory 130). As another example, the compensatory CQI value may be determined by reducing another CQI value such as the current calculated CQI value, the average reported CQI value, or the minimum reported CQI value. For example, the CQI value may be reduced by scaling the other CQI value (e.g., by applying a scaling factor), applying an offset, adjusting an input parameter to a CQI calculation, or otherwise generating a lower CQI value.

Moreover, in an aspect, UE 12 may include RF front end 104 and transceiver 106 for receiving and transmitting radio transmissions, for example, wireless communications 26 transmitted by the network entity 14 or network entity 20. For example, transceiver 106 may receive a packet on the HS-PDSCH or HS-SCCH transmitted by the network entity 14. UE 12, upon receipt of an entire message, may decode the packet and perform a cyclic redundancy check (CRC) to determine whether the packet was received correctly. For example, transceiver 106 may communicate with modem 108 to transmit messages generated by channel quality component 30 and to receive messages and forward them to channel quality component 30.

RF front end 104 may be connected to one or more antennas 102 and can include one or more low-noise amplifiers (LNAs) 141, one or more switches 142, 143, one or more power amplifiers (PAs) 145, and one or more filters 144 for transmitting and receiving RF signals. In an aspect, components of RF front end 104 can connect with transceiver 106. Transceiver 106 may connect to one or more modems 108 and processor 103.

In an aspect, LNA 141 can amplify a received signal at a desired output level. In an aspect, each LNA 141 may have a specified minimum and maximum gain values. In an aspect, RF front end 104 may use one or more switches 142, 143 to select a particular LNA 141 and its specified gain value based on a desired gain value for a particular application. In an aspect, the RF front end 104 may provide measurements (e.g., Ec/Io) and/or applied gain values to the transceiver 106 and/or calculated CQI component 44 for determining channel quality measurements.

Further, for example, one or more PA(s) 145 may be used by RF front end 104 to amplify a signal for an RF output at a desired output power level. In an aspect, each PA 145 may have a specified minimum and maximum gain values. In an aspect, RF front end 104 may use one or more switches 143, 146 to select a particular PA 145 and its specified gain value based on a desired gain value for a particular application.

Also, for example, one or more filters 144 can be used by RF front end 104 to filter a received signal to obtain an input RF signal. Similarly, in an aspect, for example, a respective filter 144 can be used to filter an output from a respective PA 145 to produce an output signal for transmission. In an aspect, each filter 144 can be connected to a specific LNA 141 and/or PA 145. In an aspect, RF front end 104 can use one or more switches 142, 143, 146 to select a transmit or receive path using a specified filter 144, LNA, 141, and/or PA 145, based on a configuration as specified by transceiver 106 and/or processor 103.

Transceiver 106 may be configured to transmit and receive wireless signals through antenna 102 via RF front end 104. In an aspect, transceiver may be tuned to operate at specified frequencies such that UE 12 can communicate with, for example, network entity 14 or network entity 20. In an aspect, for example, modem 108 can configure transceiver 106 to operate at a specified frequency and power level based on the UE configuration of the UE 12 and communication protocol used by modem 108.

In an aspect, modem 108 can be a multiband-multimode modem, which can process digital data and communicate with transceiver 106 such that the digital data is sent and received using transceiver 106. In an aspect, modem 108 can be multiband and be configured to support multiple frequency bands for a specific communications protocol. In an aspect, modem 108 can be multimode and be configured to support multiple operating networks and communications protocols. In an aspect, modem 108 can control one or more components of UE 12 (e.g., RF front end 104, transceiver 106) to enable transmission and/or reception of signals from the network based on a specified modem configuration. In an aspect, the modem configuration can be based on the mode of the modem and the frequency band in use. In another aspect, the modem configuration can be based on UE configuration information associated with UE 12 as provided by the network during cell selection and/or cell reselection.

UE 12 may further include a memory 130, such as for storing data used herein and/or local versions of applications or channel quality component 30 and/or one or more of its subcomponents being executed by processor 103. Memory 130 can include any type of computer-readable medium usable by a computer or processor 103, such as random access memory (RAM), read only memory (ROM), tapes, magnetic discs, optical discs, volatile memory, non-volatile memory, and any combination thereof. In an aspect, for example, memory 130 may be a computer-readable storage medium that stores one or more computer-executable codes defining channel quality component 30 and/or one or more of its subcomponents, and/or data associated therewith, when UE 12 is operating processor 103 to execute channel quality component 30 and/or one or more of its subcomponents. In another aspect, for example, memory 130 may be a non-transitory computer-readable storage medium.

Figure 2:
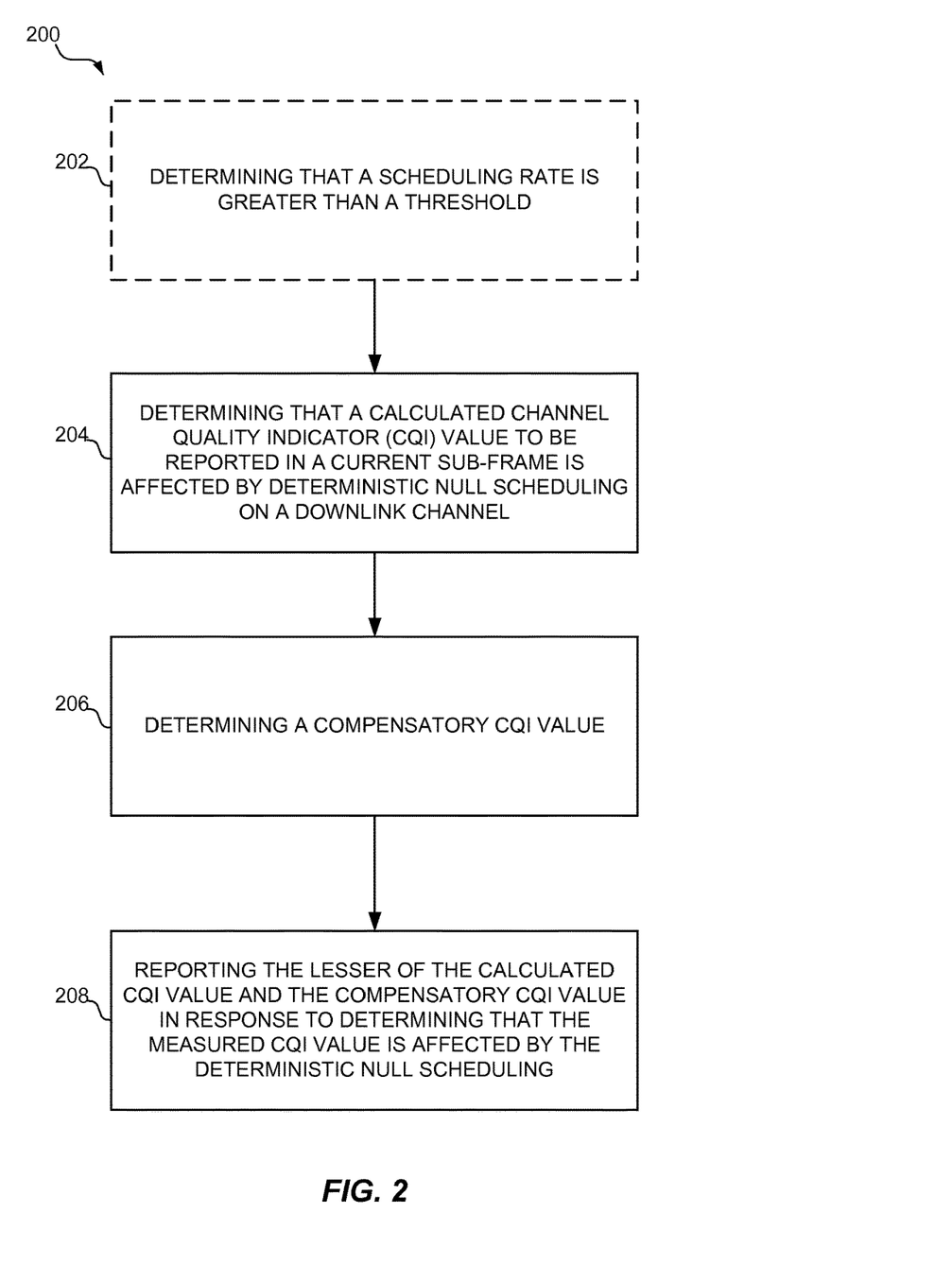
FIG. 2 is a flow diagram illustrating an example method of wireless communications.

Referring to FIG. 2, in an operational aspect, a UE such as UE 12 (FIG. 1) may perform one aspect of a method 200 for CQI reporting. While, for purposes of simplicity of explanation, the method is shown and described as a series of acts, it is to be understood and appreciated that the method (and further methods related thereto) is/are not limited by the order of acts, as some acts may, in accordance with one or more aspects, occur in different orders and/or concurrently with other acts from that shown and described herein. For example, it is to be appreciated that a method could alternatively be represented as a series of interrelated states or events, such as in a state diagram. Moreover, not all illustrated acts may be required to implement a method in accordance with one or more features described herein.

In an aspect, at block 202, the method 200 may optionally include determining that a scheduling rate is greater than a threshold. In an aspect, for example, the scheduling rate component 40 (FIG. 1) may determine that a scheduling rate for the UE 12 is greater than the threshold. In an aspect, the method 200 may proceed to block 204 responsive to determining that the scheduling rate is greater than the threshold.

In an aspect, at block 204, the method 200 may include determining that a calculated CQI value to be reported in a current sub-frame is affected by deterministic null scheduling. In an aspect, for example, the deterministic scheduling component 42 (FIG. 1) may determine that a calculated CQI value to be reported in a current sub-frame is affected by deterministic null scheduling. For example, the deterministic scheduling component 42 may determine that the current sub-frame falls within a time period defined by the parameters x and y. The deterministic scheduling component 42 may also determine that a CQI report is allowed because the current sub-frame is not within a compressed mode gap. In an aspect, the method 200 may also include determining that the calculated CQI value is affected by another form of deterministic null scheduling on a high-speed physical downlink shared channel (HS-PDSCH). For example, the deterministic scheduling component 42 may determine that the UE 12 is unlikely to be scheduled in a particular sub-frame. The deterministic scheduling component 42 may then determine whether the current sub-frame is affected by the null scheduling based on, for example, the time between the null scheduled sub-frame and the current sub-frame.

In an aspect, at block 206, the method 200 may include determining a compensatory CQI value. In an aspect, for example, the compensatory CQI component 46 may determine the compensatory CQI value. For example, the compensatory CQI component 46 may determine the compensatory CQI value based on an average calculated CQI value for a plurality of most recently scheduled sub-frames. As another example, the compensatory CQI component 46 may determine the compensatory CQI value by selecting a minimum calculated CQI from reported CQI values for a plurality of most recently scheduled sub-frames. The compensatory CQI component 46 may also determine the compensatory CQI value based on a fixed value or by reducing another CQI value.

In an aspect, at block 208, the method 200 may include reporting the lesser of the calculated CQI value and the compensatory CQI value in response to determining that the calculated CQI value is affected by the deterministic null scheduling. In an aspect, for example, the transmitter 34 may report the lesser of the calculated CQI value and the compensatory CQI value. In an aspect, for example, the calculated CQI value may be determined by the calculated CQI component 44 (FIG. 1). Generally, the lesser CQI value will indicate lower quality channel conditions. When the current sub-frame is affected by deterministic null scheduling, the compensatory CQI value will usually be less than the calculated CQI value. However, the calculated CQI value may be less than the compensatory CQI value, for example, when the channel quality suddenly deteriorates. Accordingly, reporting the lesser of the calculated CQI value and the compensatory CQI value may account for changes in channel conditions.

Figure 3:
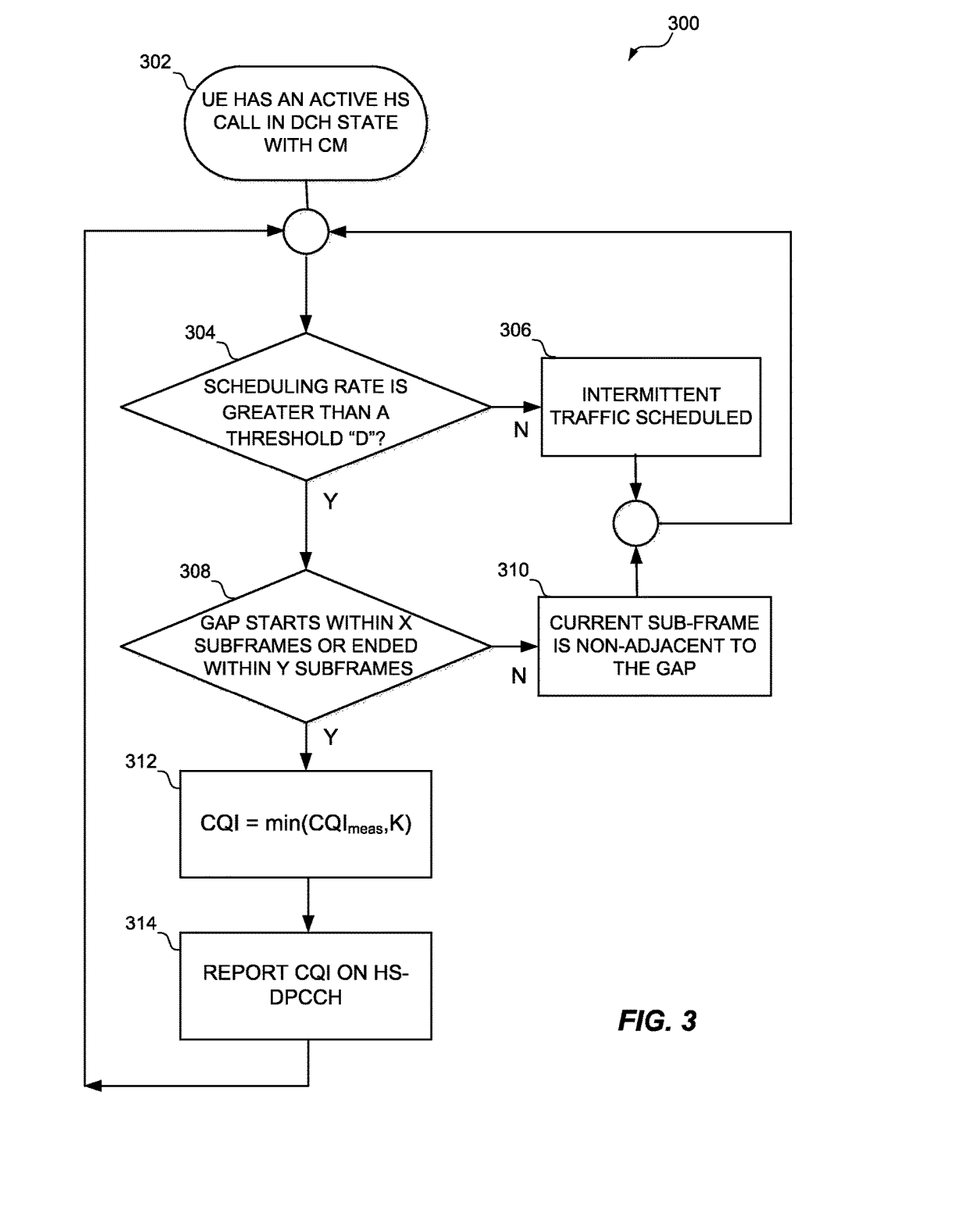
FIG. 3 is a flow diagram illustrating another example method of wireless communications.

FIG. 3 is a flowchart illustrating another method 300 of reporting CQI, where method 300 may represent one particular use case of implementing the aspects of the present disclosure. As such, method 300 may represent a more detailed implementation of method 200 (FIG. 2). For example, in an operational aspect, a UE such as UE 12 (FIG. 1) may perform one aspect of a method 300 for CQI reporting. While, for purposes of simplicity of explanation, the method is shown and described as a series of acts, it is to be understood and appreciated that the method (and further methods related thereto) is/are not limited by the order of acts, as some acts may, in accordance with one or more aspects, occur in different orders and/or concurrently with other acts from that shown and described herein. For example, it is to be appreciated that a method could alternatively be represented as a series of interrelated states or events, such as in a state diagram. Moreover, not all illustrated acts may be required to implement a method in accordance with one or more features described herein.

In block 302, the method 300 may begin when the UE 12 has an active high-speed call in a dedicated channel (DCH) state with compressed mode. In an aspect, for example, the channel quality component 30 may determine when the UE 12 has an active high-speed call in a DCH state with compressed mode.

In block 304, the method 300 may include determining whether the scheduling rate is greater than a threshold, D. In an aspect, for example, the scheduling rate component 40 may determine whether the scheduling rate is greater than the threshold D. For example, the threshold D may be configured between approximately 60% and approximately 90% for a scheduling rate based on scheduled sub-frames for the UE 12. If the scheduling rate is not above the threshold, the method 300 may proceed to block 306, where the scheduling rate component 40 may determine that only intermittent traffic is scheduled. Accordingly, the scheduling rate component 40 may determine that it is unnecessary to change CQI reporting for the current sub-frame. The method 300 may return to block 304 for the next sub-frame.

If the scheduling rate is greater than the threshold D, in block 308, the method 300 may include determining whether the deterministic null scheduling (e.g., compressed mode gap) starts within the next x sub-frames or the end of the deterministic null scheduling was within the last y sub-frames. In an aspect, for example, the deterministic scheduling component 42 may determine whether the compressed mode gap starts within the next x sub-frames or the end of compressed mode gap was within the last y sub-frames. The parameters x and y may be whole numbers. If the compressed mode gap does not start within the next x sub-frames and the end of compressed mode gap was not within the last y sub-frames, in block 310, the deterministic scheduling component 42 may determine that the current sub-frame is a non-adjacent sub-frame to the compressed mode gap. In other words, the current sub-frame may not be affected by the compressed mode gap. Accordingly, the deterministic scheduling component 42 may determine that that it is unnecessary to change CQI reporting for the current sub-frame. The method 300 may return to block 304 for the next sub-frame.

If the current sub-frame is an adjacent sub-frame (e.g., affected by the compressed mode gap), in block 312, the method 300 may include setting the CQI value to the minimum of the calculated CQI value or a compensatory CQI value, K. The calculated CQI value may be determined by the calculated CQI component 44. The compensatory CQI value K may be determined by the compensatory CQI component 46.

In block 314, the method 300 may include reporting the CQI value on the HS-DPCCH. In an aspect, for example, the transmitter 34 may report the CQI value on the HS-DPCCH. The reported CQI value may help reduce the effects of the compressed mode gap on scheduling at the network entity 14. For example, the reported CQI value may avoid an artificially boosted CQI, which in turn may prevent the network entity 14 from selecting a modulation scheme or block size that the UE 12 will be unable to decode. Accordingly, the reported CQI value may improve downlink throughput by reducing decoding errors. After reporting the CQI value, the method 300 may return to block 304 for the next sub-frame.

Figure 4:
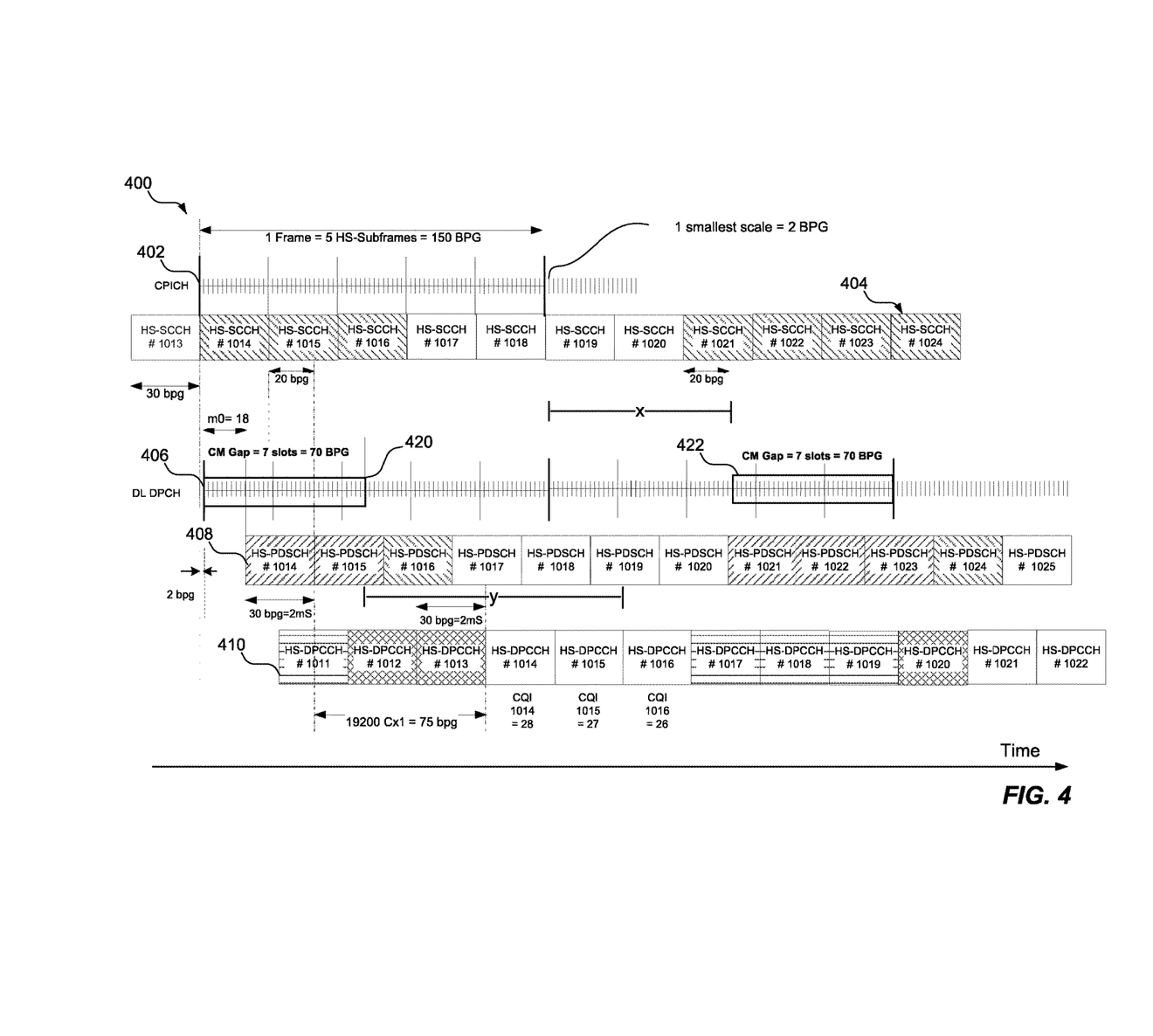
FIG. 4 is a diagram illustrating timing of HSPA channels and compressed mode transmission gaps.

FIG. 4 is a diagram 400 illustrating timing of compressed mode transmission gaps in high speed channels. In an aspect, sub-frames having deterministic null scheduling may be determined based on the timing of the compressed mode transmission gaps. In the diagram 400, a channel may be represented by a series of sub-frames. In an aspect, an HSPA system may have a 2 millisecond (ms) sub-frame (also referred to as a transmission time interval (TTI)), where each TTI comprises 3 slots. As illustrated in diagram 400, timing of the channels may be varied in units of block processing groups (BPG), which may be equal to one-tenth of a slot (approximately 0.067 ms).

The common pilot channel (CPICH) 402 may be constantly transmitted by the network entity 14. The CPICH 402 may be used by the UE 12 to perform measurements. The timing for other channels may be based on the CPICH. The high-speed shared control channel (HS-SCCH) 404, may be transmitted by the network entity 14 to carry scheduling information for the UE 12. For example, the HS-SCCH 404 may indicate whether the UE 12 is scheduled to receive data on the high-speed physical downlink shared channel (HS-PDSCH) 408. The HS-SCCH 404 may also indicate a modulation and coding scheme. The downlink DPCH 406 may be a dedicated channel for the UE 12. In an aspect, the downlink DPCH 406 may be a fractional DPCH 406 with a timing offset. For example, the timing offset illustrated in diagram 400 may be 2 bpg. The HS-PDSCH 408 may carry downlink traffic for one or more UEs. The high speed dedicated physical control channel (HS-DPCCH) 410 may be an uplink channel used by the UE 12 to provide feedback to the network entity 14 regarding the HS-PDSCH 408. In particular, the HS-DPCCH 410 may include an ACK/NACK portion and a CQI portion in a sub-frame corresponding to a previous HS-DPCCH sub-frame. A sub-frame of the HS-DPCCH may be transmitted 5 slots (75 bpg or 19200 chips) after the corresponding sub-frame of the HS-PDSCH.

The compressed mode gaps 420, 422 may be based on the timing of the DPCH 406. For example, the network entity 14 or RNC 16 (FIG. 1) may configure the UE 12 (FIG. 1) with compressed mode gap scheduling based on the DPCH. In an aspect, a compressed mode gap 420 may be up to 7 slots. Two compressed mode gaps may be scheduled consecutively in consecutive frames for a maximum total length of 14 slots. During a compressed mode gap 420, the UE 12 may neglect receiving of any sub-frames of the HS-SCCH 404 and the HS-PDSCH 408 that overlap the compressed mode gap 420. Accordingly, any sub-frames that overlap with the compressed mode gap may be considered to have deterministic null scheduling because the timing of the compressed mode gaps is known to the UE 12. The UE 12 may also use discontinuous transmission (DTX) to refrain from transmitting an ACK/NACK portion of the HS-DPCCH 410 during the compressed mode gap 420. Similarly, the UE 12 may refrain from transmitting a CQI portion of the HS-DPCCH 412 that overlaps the compressed mode gap 420. The UE 12 may also refrain from transmitting the CQI where the reference slots used to determine the CQI overlap the compressed mode gap 420. The compressed mode gap 422 may be similar to the compressed mode gap 420 except occurring at a later time.

The compressed mode gap 420 may affect the above described channels. For example, the HS-SCCH 404 may not be decoded in sub-frames 1014, 1015, and 1016, due to overlap with the compressed mode gap 420 and in sub-frames 1021, 1022, and 1023 due to overlap with the compressed mode gap 422. Accordingly, sub-frames 1014, 1015, 1016, 1021, 1022, and 1023 may be considered to have deterministic null scheduling because the scheduling information on these sub-frames cannot be read. Additionally, HS-PDSCH 408 may not be decoded in sub-frames 1014 and 1015 due to the compressed mode gap 420, in sub-frames 1021, 1022, and 1023 due to the compressed mode gap 422. Further, because of the lack of decoding of HS-SCCH 404, the UE 12 may not be scheduled on HS-PDSCH 408 in sub-frames 1016, and 1024 even though these HS-PDSCH sub-frames do not overlap the compressed mode gaps 420, 422. In the uplink, HS-DPCCH 410 may not be transmitted in sub-frames 1011 and 1012 because of overlap with compressed mode gap 420 and may not be transmitted in sub-frames 1017-1019 due to overlap with compressed mode gap 420. Further, HS-DPCCH 410 may not include a CQI in sub-frames 1013, and 1020 because the reference periods overlap the compressed mode gaps 420, 422.

Given the above limitations imposed by the compressed mode gaps 420, 422, the calculated CQI value may be affected for other sub-frames. For example, because the HS-PDSCH cannot receive an ACK/NACK for sub-frames 1017-1019, the network entity 14 may not schedule any data during those sub-frames. Therefore, sub-frames 1017-1019 may also be considered to have deterministic null scheduling. Accordingly, the calculated CQI values reported in HS-DPCCH 410 sub-frames 1014-1016 may be affected by the compressed mode gap 422 (due to deterministic null scheduling of HS-PDSCH sub-frames 1017-1019 during the reference period), even though these uplink sub-frames do not overlap the compressed mode gap 422. Also, even though the UE 12 is allowed to report the CQI in HS-DPCCH sub-frames 1014, 1015, 1021, and 1022, the calculated CQI value may be affected because the UE 12 was not scheduled to decode the HS-PDSCH during the reference period for those sub-frames. Moreover, as illustrated in diagram 400, depending on the timing of the compressed mode gaps 420, 422, it is possible for a sub-frame (e.g. HS-DPCCH sub-frame 1015) to be affected by both the compressed mode gap 420 before the sub-frame and the compressed mode gap 422 after the sub-frame.

Several aspects of a telecommunications system have been presented with reference to a W-CDMA system. As those skilled in the art will readily appreciate, various aspects described throughout this disclosure may be extended to other telecommunication systems, network architectures and communication standards.

By way of example, various aspects may be extended to other UMTS systems such as High Speed Downlink Packet Access (HSDPA), High Speed Uplink Packet Access (HSUPA), High Speed Packet Access Plus (HSPA+) and TD-CDMA. Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

In accordance with various aspects of the disclosure, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. The computer-readable medium may be a non-transitory computer-readable medium. A non-transitory computer-readable medium includes, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable medium for storing software and/or instructions that may be accessed and read by a computer. The computer-readable medium may be resident in the processing system, external to the processing system, or distributed across multiple entities including the processing system. The computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

What is claimed is:

1. A method of wireless communication for reporting a channel quality indicator (CQI), comprising:
   determining, by a user equipment (UE), that a calculated CQI value to be reported in a current sub-frame is affected by a deterministic null scheduling on a downlink channel, wherein the calculated CQI value from which the determination is made is based on a measured channel quality and indicates a transport block size that the UE can receive with a given block error rate;
   determining a compensatory CQI value; and
   reporting the lesser of the calculated CQI value and the compensatory CQI value in response to determining that the calculated CQI value is affected by the deterministic null scheduling.

2. The method of claim 1, wherein determining that the calculated CQI value is affected by the deterministic null scheduling comprises determining whether the current sub-frame is within a configured time period of a sub-frame with the deterministic null scheduling.

3. The method of claim 1, wherein determining that the calculated CQI value is affected by the deterministic null scheduling comprises determining that the deterministic null scheduling occurs during a compressed mode gap.

4. The method of claim 3, wherein determining that the calculated CQI value is affected by the deterministic null scheduling comprises determining that the current sub-frame is within a first time period before the start of the compressed mode gap.

5. The method of claim 3, wherein determining that the calculated CQI value is affected by the deterministic null scheduling comprises determining that the current sub-frame is affected by a change in scheduling due to the compressed mode gap.

6. The method of claim 1, wherein determining the compensatory CQI value comprises determining an average reported CQI value for a plurality of most recently scheduled sub-frames.

7. The method of claim 1, wherein determining the compensatory CQI value comprises selecting a minimum reported CQI value for a plurality of most recently scheduled sub-frames.

8. The method of claim 1, wherein determining the compensatory CQI value comprises using a fixed CQI value.

9. The method of claim 1, wherein determining the compensatory CQI value comprises reducing another CQI value.

10. The method of claim 1, wherein the reporting the lesser of the calculated CQI value and the compensatory CQI value is further in response to determining that a scheduling rate is greater than a threshold.

11. The method of claim 10, further comprising reporting the calculated CQI when the scheduling rate is less than or equal to the threshold.

12. The method of claim 1, wherein the reporting is further in response to determining that a UE is in an active high-speed call in a dedicated channel state with compressed mode active.

13. The method of claim 1, wherein the downlink channel is a high-speed physical downlink shared channel (HS-PDSCH).

14. An apparatus for reporting a channel quality indicator (CQI) in wireless communications, comprising:
  a transceiver configured to receive sub-frames of a downlink channel and transmit the CQI corresponding to a current sub-frame;
  a memory configured to store scheduling information for the downlink channel; and
  at least one processor communicatively coupled to the transceiver and to the memory via at least one bus, the at least one processor configured to:
    determine that a calculated CQI value to be reported in the current sub-frame is affected by deterministic null scheduling on the downlink channel based on the scheduling information, wherein the calculated CQI value from which the determination is made is based on a measured channel quality and indicates a transport block size that the transceiver can receive with a given block error rate,
    determine a compensatory CQI value, and
    report, via the transceiver, the lesser of the calculated CQI value and the compensatory CQI value in response to determining that the calculated CQI value is affected by the deterministic null scheduling.

15. The apparatus of claim 14, wherein the at least one processor is configured to determine that the calculated CQI value is affected by the deterministic null scheduling when the current sub-frame is within a configured time period of a sub-frame with the deterministic null scheduling.

16. The apparatus of claim 14, wherein the at least one processor is configured to determine that the calculated CQI value is affected by the deterministic null scheduling when the deterministic null scheduling occurs during a compressed mode gap.

17. The apparatus of claim 16, wherein the at least one processor is configured to determine that the calculated CQI value is affected by the deterministic null scheduling when the current sub-frame is within a first time period before the start of the compressed mode gap.

18. The apparatus of claim 14, further comprising:
  an antenna; and
  a radio frequency (RF) front end coupled to the antenna and to the transceiver, the RF front end configured to transmit the lesser of the calculated CQI value and the compensatory CQI value on a high speed dedicated control channel via the antenna to a network entity and to receive, via the antenna, the downlink channel.

19. The apparatus of claim 18, wherein the transceiver is further configured to determine a channel quality of the downlink channel during the current sub-frame based on measurements by the RF front end, and wherein the at least one processor is further configured to determine the calculated CQI value based on the channel quality of the downlink channel during the current sub-frame.

20. The apparatus of claim 14, wherein the memory is further configured to store a reported CQI value for each of a plurality of most recently scheduled sub-frames and the at least one processor is configured to determine the compensatory CQI value by determining an average calculated CQI for the plurality of most recently scheduled sub-frames.

21. The apparatus of claim 14, wherein the memory is further configured to store a reported CQI value for each of a plurality of most recently scheduled sub-frames and the at least one processor is configured to determine the compensatory CQI value by selecting a minimum reported CQI for the plurality of most recently scheduled sub-frames.

22. The apparatus of claim 14, wherein the at least one processor is configured to determine the compensatory CQI value by using a fixed CQI value.

23. The apparatus of claim 14, wherein the at least one processor is configured to determine the compensatory CQI value by reducing another CQI value.

24. The apparatus of claim 14, wherein the at least one processor is further configured to determine whether a scheduling rate is greater than a threshold, wherein the reporting the lesser of the calculated CQI value and the compensatory CQI value is in response to determining that the scheduling rate is greater than the threshold.

25. The apparatus of claim 14, wherein the at least one processor is further configured to determine whether the apparatus is in an active high-speed call in a dedicated channel state with compressed mode active, wherein the reporting is in response to determining that the apparatus is in the active high-speed call in the dedicated channel state with the compressed mode active.

26. An apparatus for reporting a channel quality indicator (CQI), comprising:
  means for determining, at a user equipment (UE), that a calculated CQI value to be reported in a current sub-frame is affected by deterministic null scheduling on a downlink channel, wherein the calculated CQI value from which the determination is made is based on a measured channel quality and indicates a transport block size that the UE can receive with a given block error rate;
  means for determining a compensatory CQI value; and
  means for reporting the lesser of the calculated CQI value and the compensatory CQI value in response to determining that the calculated CQI value is affected by the deterministic null scheduling.

27. The apparatus of claim 26, wherein the means for determining that the calculated CQI value to be reported in the current sub-frame is affected by the deterministic null scheduling on the downlink channel is further for determining that the deterministic null scheduling occurs during a compressed mode gap and determining whether the current sub-frame is within a first time period before the start of the compressed mode gap.

28. The apparatus of claim 26, wherein the means for determining the compensatory CQI value is further for:
   determining an average calculated CQI for a plurality of most recently scheduled sub-frames;
   selecting a minimum calculated CQI for the plurality of most recently scheduled sub-frames;
   using a fixed CQI value; or
   reducing another CQI value.

29. The apparatus of claim 26, further comprising means for determining whether a scheduling rate is greater than a threshold, wherein the reporting the lesser of the calculated CQI value and the compensatory CQI value is in response to determining that the scheduling rate is greater than the threshold.

30. A non-transitory computer-readable medium storing computer executable code for reporting a channel quality indicator (CQI), comprising:
   code for determining, by a user equipment (UE), that a calculated CQI value to be reported in a current sub-frame is affected by a deterministic null scheduling on a downlink channel, wherein the calculated CQI value from which the determination is made is based on a measured channel quality and indicates a transport block size that the UE can receive with a given block error rate;
   code for determining a compensatory CQI value; and
   code for reporting the lesser of the calculated CQI value and the compensatory CQI value in response to determining that the calculated CQI value is affected by the deterministic null scheduling.

31. The non-transitory computer-readable medium of claim 30, wherein the code for determining that the calculated CQI value to be reported in the current sub-frame is affected by the deterministic null scheduling on the downlink channel comprises code for determining that the deterministic null scheduling occurs during a compressed mode gap and code for determining whether the current sub-frame is within a first time period before the start of the compressed mode gap.

* * * * *